Jan. 24, 1939. H. A. RAU 2,144,708
COUNTING MECHANISM
Filed Aug. 21, 1935 8 Sheets-Sheet 1

Inventor
Harry A. Rau.
By
Attorneys

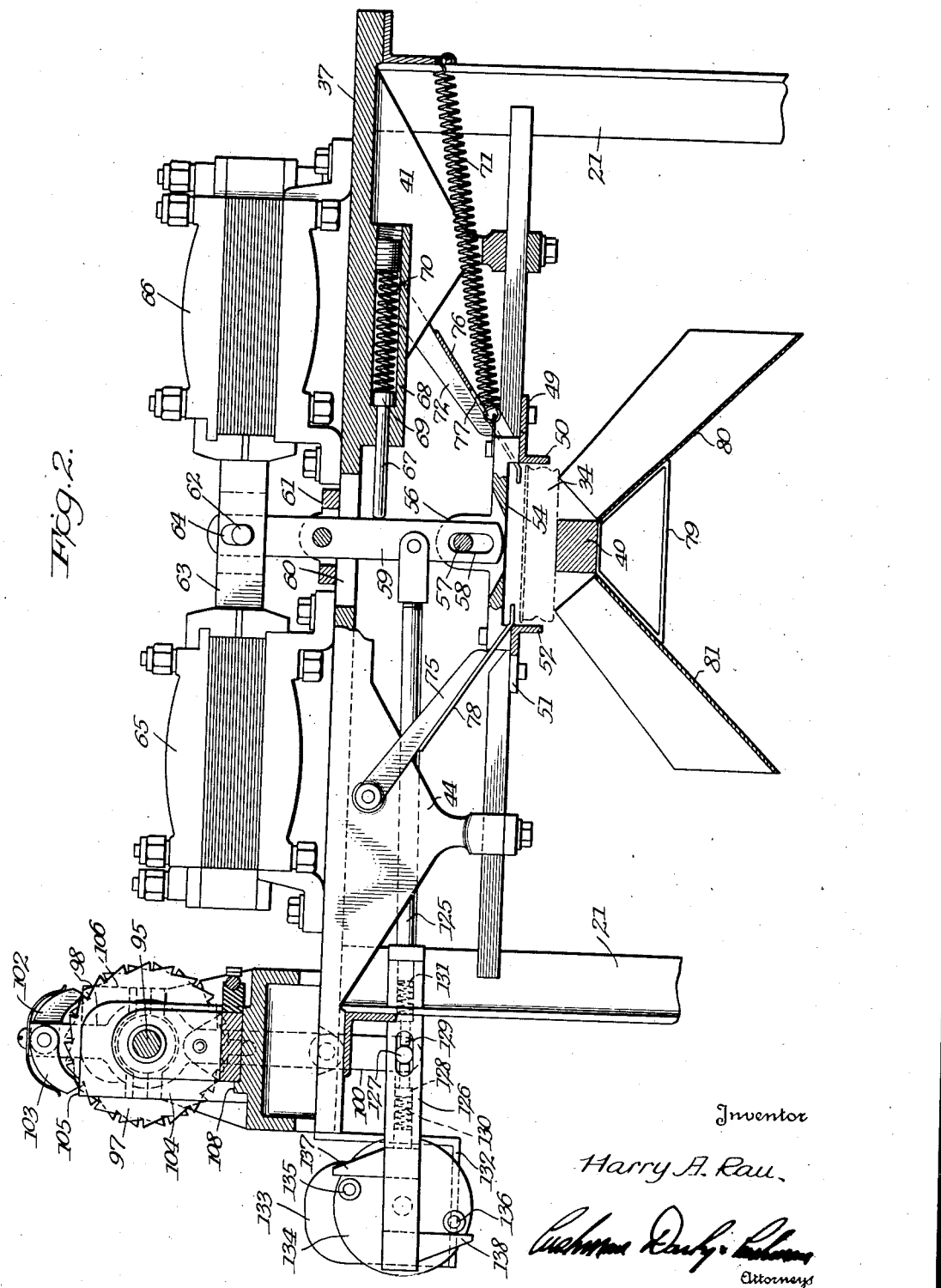

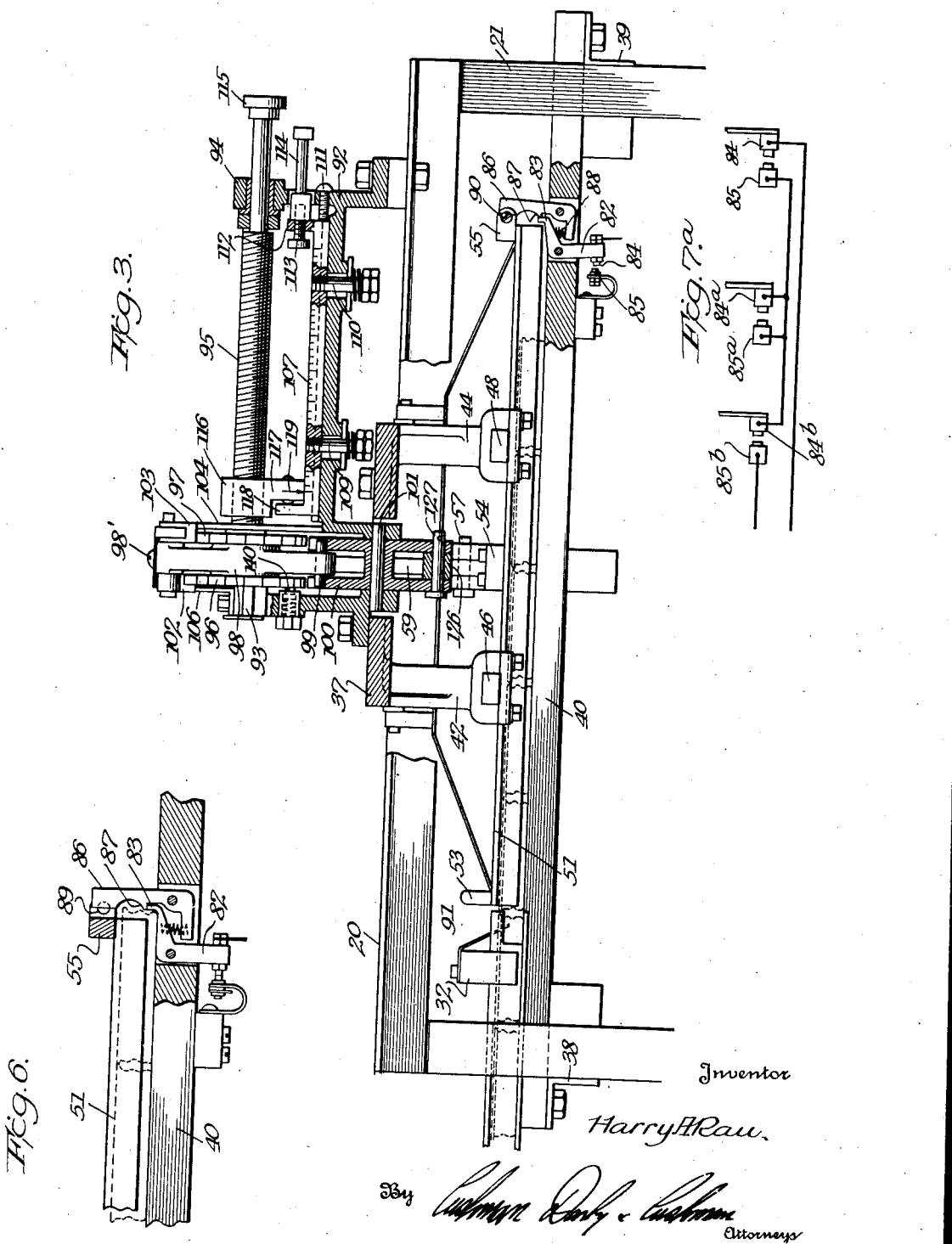

Jan. 24, 1939.  H. A. RAU  2,144,708
COUNTING MECHANISM
Filed Aug. 21, 1935  8 Sheets-Sheet 4
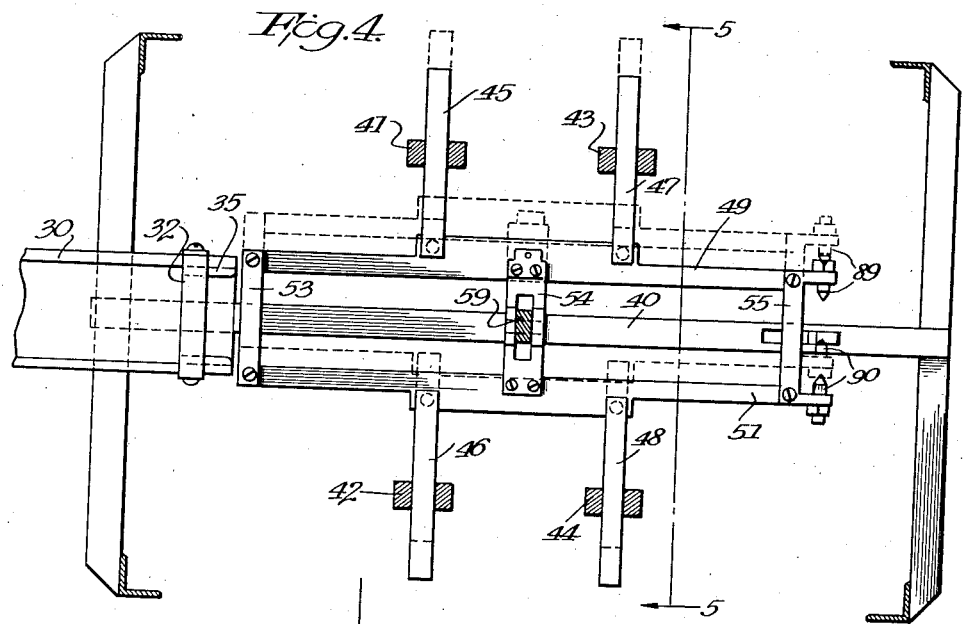
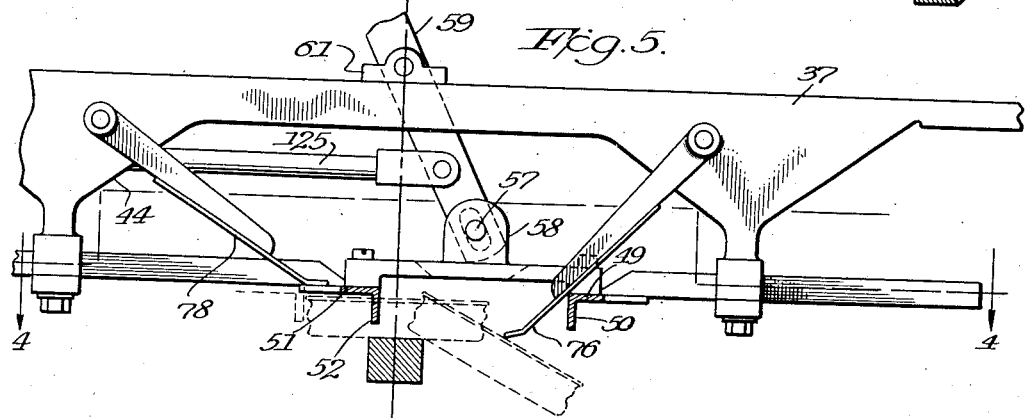
Inventor
Harry A. Rau.
By Cushman Darby Cushman
Attorneys

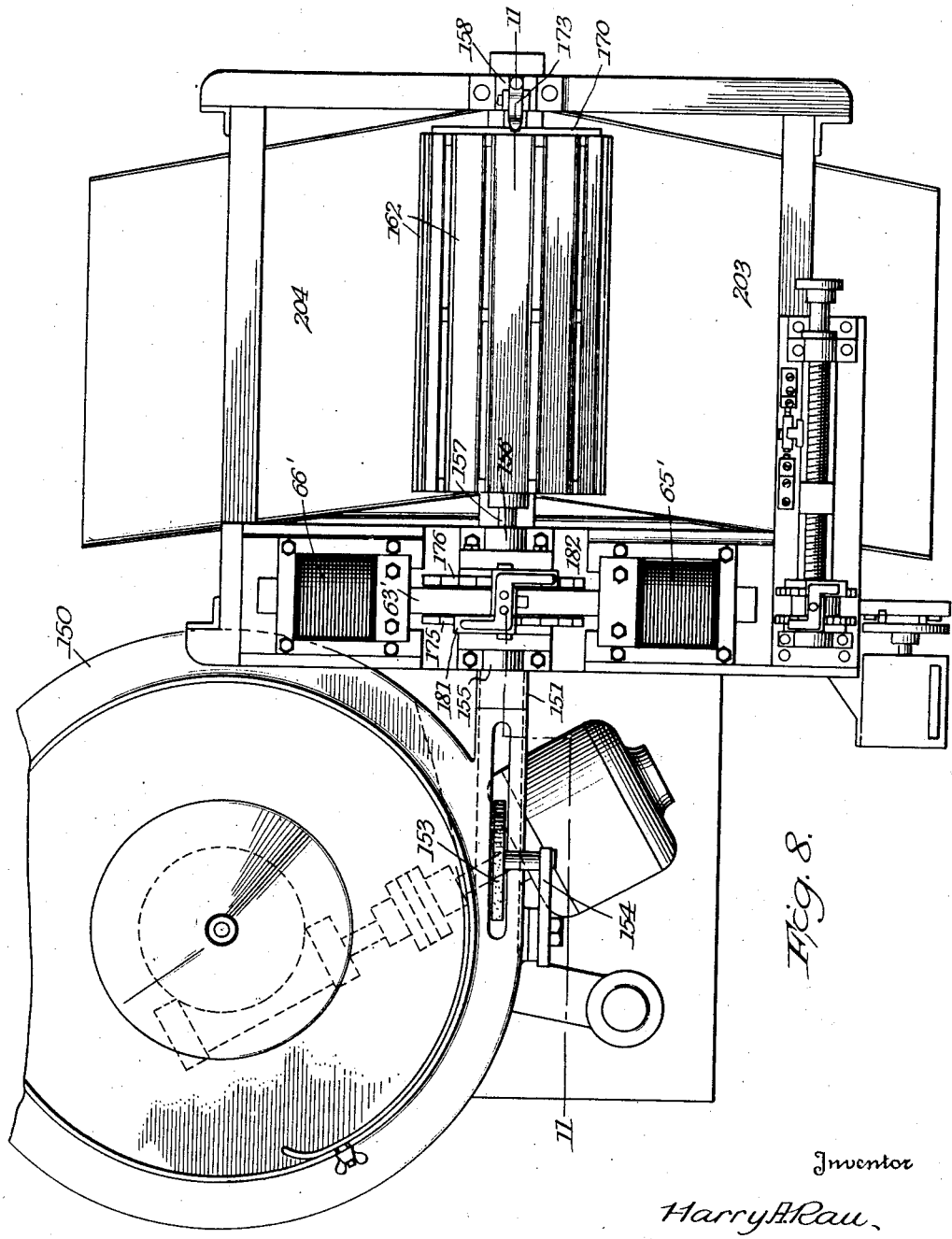

Jan. 24, 1939.                H. A. RAU                 2,144,708
                         COUNTING MECHANISM
                       Filed Aug. 21, 1935·          8 Sheets—Sheet 6
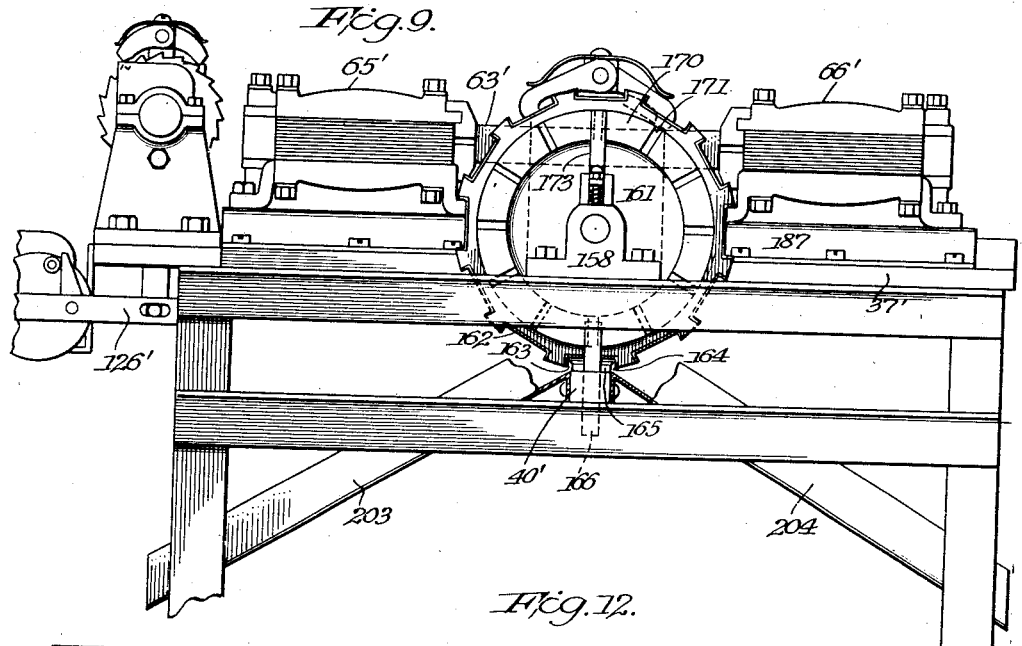
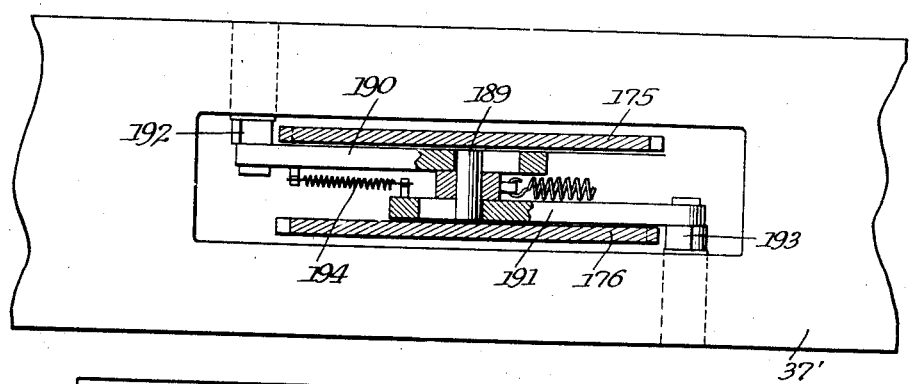
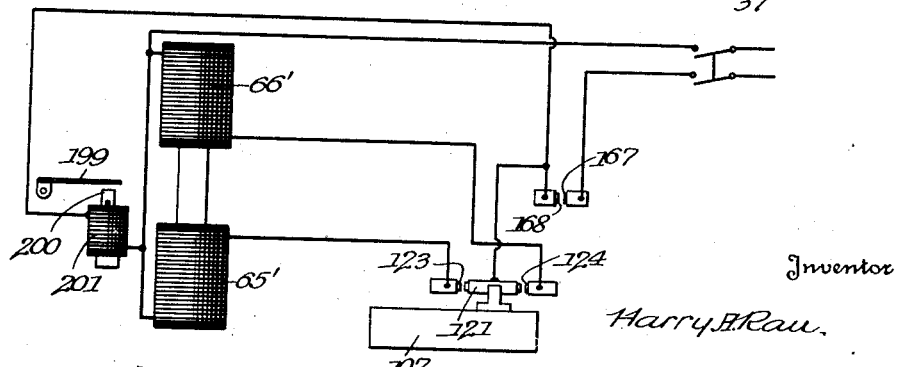

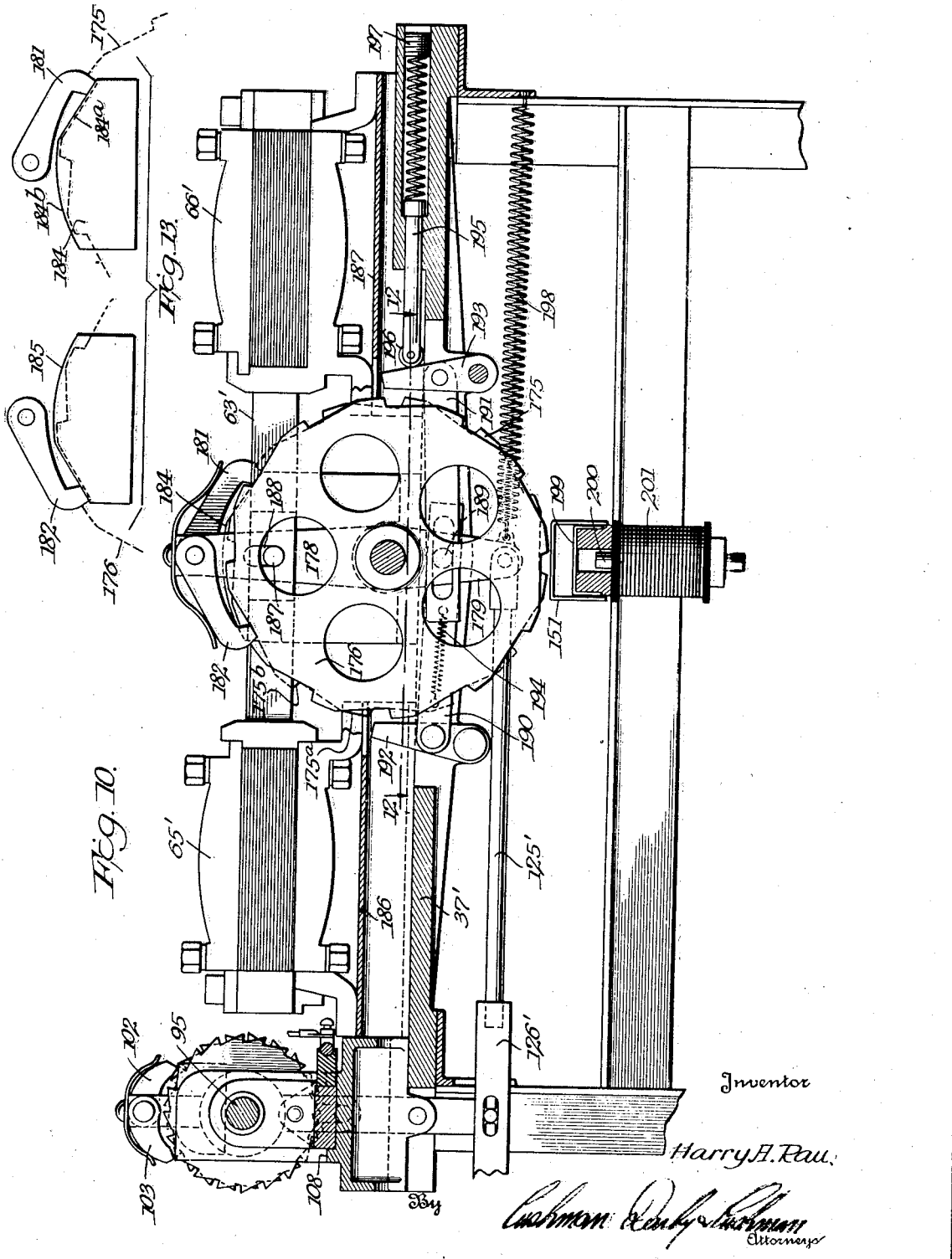

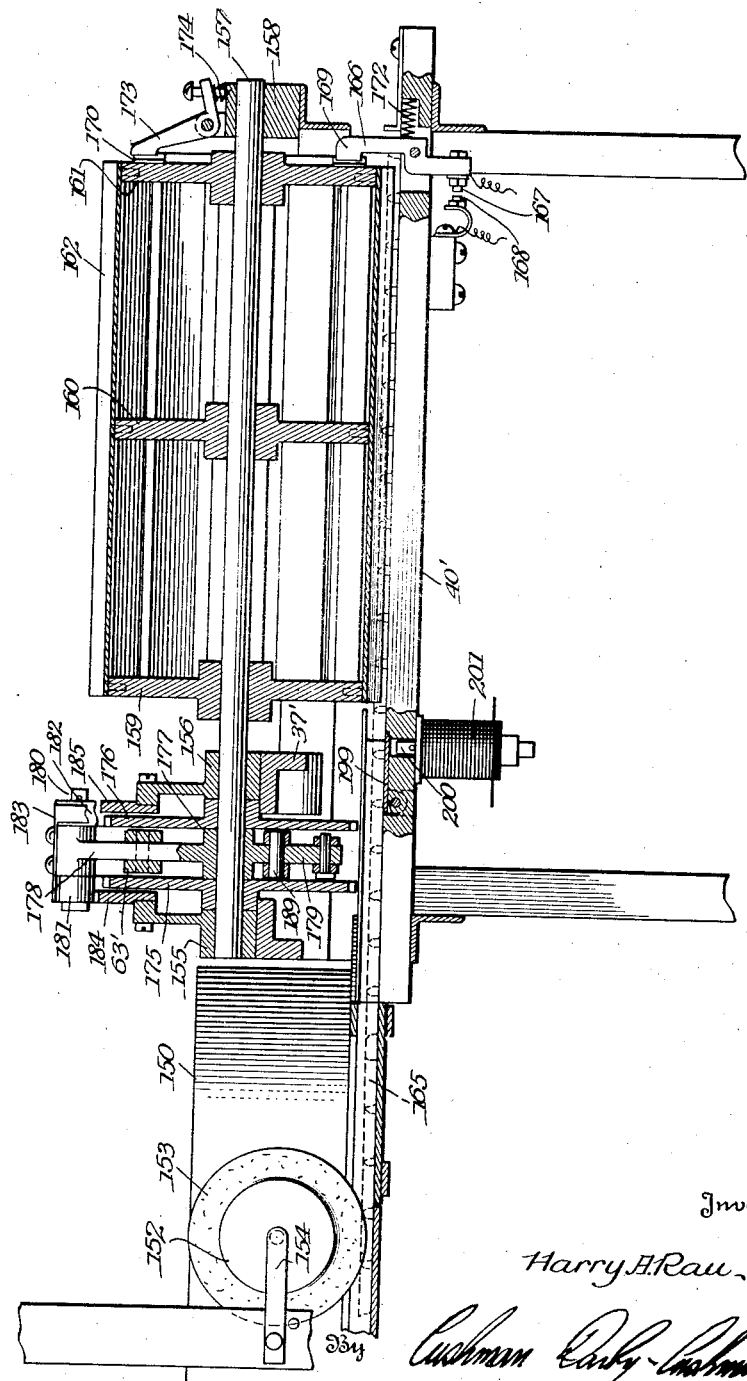

Patented Jan. 24, 1939

2,144,708

UNITED STATES PATENT OFFICE 2,144,708

COUNTING MECHANISM

Harry A. Rau, Baltimore, Md., assignor to Crown Cork & Seal Company, Inc., Baltimore, Md., a corporation of New York Application August 21, 1935, Serial No. 37,229

23 Claims. (Cl. 235—98)

The present invention relates to means for rapidly and efficiently counting articles such, for example, as container closures.

Under the usual practice in the manufacture of closures such as crown caps, for example, count is established by weight, but this method is frequently inaccurate due to nonuniformity of the cap metal, inserts, coating, etc.

The purpose of the present invention is to provide relatively simple apparatus designed to afford an absolutely correct count. To this end, I provide means whereby the leading article of a fed line upon coming to an ejecting station sets in operation means whereby the leading article, or a certain number of the leading articles, is ejected. Each ejecting operation preferably affects mechanism designed to reverse the direction of ejection upon the completion of a certain number of ejecting actions so that receptacles at different points will alternately have a certain number of articles delivered thereto. For the sake of speed, the articles are preferably ejected in groups of predetermined number, the total count being the number of ejecting actions times the group number.

Since the invention will be most clearly understood from a description of specific apparatus for carrying it out, I shall proceed to describe it with reference to the accompanying drawings which show it in practical embodiment. In the drawings, Figure 1 is a plan view of a machine embodying the invention;

Figure 2 is a section substantially on line 2—2 of Figure 1;

Figure 3 is a section substantially on line 3—3 of Figure 1 and partly broken away in another plane;

Figure 4 is a section substantially on line 4—4 of Figure 5;

Figure 5 is a section substantially on line 5—5 of Figure 4;

Figure 6 shows a detail partly in elevation and partly in section;

Figure 7 is a diagram showing an electrical circuit for the machine;

Figure 7a shows diagrammatically a modification utilizable in the circuit of Figure 7;

Figure 8 is a plan view of another embodiment of the invention;

Figure 9 is an end elevation of the machine of Figure 8;

Figure 10 is a section substantially on line 10—10 of Figure 8;

Figure 11 is a section substantially on line 11—11 of Figure 8;

Figure 12 is a section substantially on line 12—12 of Figure 10;

Figure 13 shows in elevation a pair of pawl control plates utilized in the second embodiment; and Figure 14 is a diagram of an electric circuit utilizable in the second embodiment.

Figure 1:
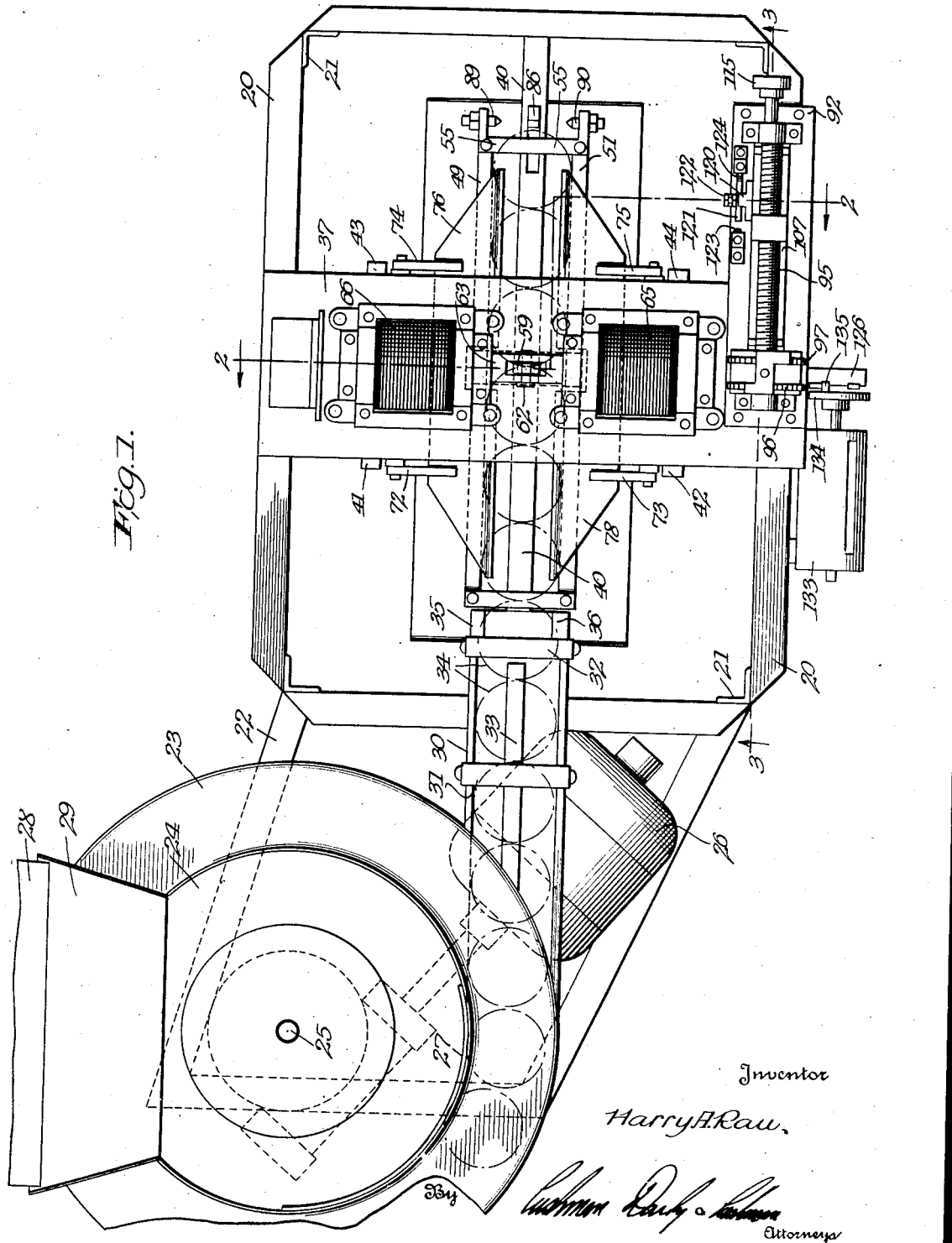

While the invention is not limited to the type of article to be counted, it will be assumed herein that container closures are to be dealt with.

Referring first to Figures 1 to 7a, reference numeral 20 designates a substantially rectangular horizontal frame supported on legs 21, the frame 20 at the left of Figure 1 supporting an extension frame 22. The extension frame supports a circular hopper 23 of well known design, the hopper bottom being constituted by a disc 24 mounted on a vertical shaft 25 to be rotated by means of a motor 26. Spaced closely above the disc at one side is an arcuate guide strip 27 which is spaced from the adjacent outer hopper wall by about the diameter of the caps to be fed. The disc 24, rotated in a counter-clockwise direction, receives the caps from a conveyor 28 by way of a chute 29 and throws the caps outwardly and propels them in a line behind plate 27 and along a rectilinear chute 30. Chute 30 has upstanding side walls connected by cross straps as at 31 and 32, the former supporting a horizontal bar 33 which acts as a hold-down for the caps 34 in the chute. At their extremities, the chute side walls have inturned top flanges 35 and 36 which overlie the edges of the caps to prevent lifting thereof.

A bed plate 37 extends transversely of frame 20 and is supported by the medial portions of the longitudinal frame members. Lower frame cross members 38 and 39 support a square bar 40 which extends in rectilinear continuation of chute 30 with its top surface flush with the upper surface of the bottom wall of the chute. The width of bar 40 is less than the width of the bottom wall of the chute, the bar and chute having the same central vertical longitudinal plane.

Depending from bed plate 37 are four arms 41, 42, 43, and 44, the arms 41 and 42 slidably supporting at their lower ends bars 45 and 46, arms 43 and 44 similarly supporting bars 47 and 48. Secured to the inner end of arms 45 and 47 is the horizontal flange of an angle 49, the angle having a vertical leg 50. Arms 46 and 48 similarly support an angle 51 which has a vertical leg 52. Legs 50 and 52 are parallel and spaced apart as the side walls of chute 30, bridge members 53, 54 and 55 being secured to the tops of the horizontal flanges of the angles to maintain their spaced relation and provide a rigid frame.

The bridge piece 54 has a central upstanding bifurcated lug 56 which supports a pin 57, the latter being engaged in an elongated slot 58 of a lever 59 which is passed upwardly through a slot 60 in the bed plate and pivoted in a bracket 61. An upward extension of lever 59 carries a pin 62 and is received in a slot in a core rod 63, the pin being engaged in vertically elongated slots as at 64 in the adjacent walls of the member 63. The ends of core 63 are received in solenoids 65 and 66.

A plunger 67 is slidable in a bore in an enlargement 68 beneath plate 37, the plunger having a head 69 received in an enlarged bore and engaged by a compression spring 70. A tension spring 71 is anchored at one end to the bridge piece 54 and at the other end to the frame of the machine. Spring 70 tends to swing lever 59 in a clockwise direction while spring 79 tends to swing the lever in a counter-clockwise direction. The action of the two springs is balanced so that ordinarily lever 59 occupies the vertical position shown in Figure 2 with the vertical flanges 50 and 52 of angles 49 and 51 in exact alignment with the side walls of chute 30. Flanges 50 and 52 constitute in effect the side walls of a chute of which the bottom wall is constituted by bar 40. With the walls 50 and 52 positioned as in Figure 2, caps will be fed from chute 30 along bar 40, as indicated in Figure 2, until arrested.

Arms 72, 73, 74 and 75 are pivoted to side flanges of plate 37. At their free ends, arms 72 and 74 support a striker in the form of a plate 76, whose lower marginal portion rests on the inner edge of angle 49 and projects somewhat below the top surface of the latter, the extreme marginal portion being bent upwardly as shown in Figure 2 to lie somewhat above the upper edges of the caps 34. The plate extends substantially the full distance between bridge pieces 53 and 55 and is provided with a central recess 77 clearing bridge piece 54. Arms 73 and 75 support a striker plate 78 exactly the same as plate 76.

Brackets as at 79 secured below bar 40 support downwardly divergent chutes 80 and 81 which extend longitudinally for at least substantially the full length of angles 49 and 51.

In a vertical slot in bar 40 at the right hand extremity of angles 50 and 51 is pivoted a bell crank lever 82 which, in normal position, presents a toe 83 above the top surface of bar 40. At its end opposite toe 83, the lever carries a contact 84 adapted to cooperate with a fixed contact 85, both contacts being insulated from the machine frame. Beyond lever 82, a latch 86 is pivoted in the slot with a main upwardly extending portion which presents a lug 87 normally lying behind the upper end of toe 83. Latch 86 has a lower horizontal portion extending beneath the upper portion of lever 82 and between these portions is interposed a weak compression spring 88.

Bridge piece 55 has outwardly extending arms at its extremities in which are threaded and locked screws 89 and 90 having opposed ends which are coaxial and pointed, the points of the pins being in the horizontal plane of the upper end of latch 86.

When the leading cap of the fed line abuts toe 83, lever 82 is swung in a clockwise direction, the upper end of toe 83 becomes engaged under lug 87, as shown in Figure 6, and the switch 84, 85 is closed. The closing of the switch, it may be assumed, completes a circuit to solenoid 65 so that bar 63 is drawn to the left, Figure 2, thus swinging lever 59, Figure 5, in a counter-clockwise direction and, through the pin and slot connection 57, 58, sliding walls 50 and 52 to the right, pushing the caps on bar 40 transversely of the latter to eject them onto chute 80 under which a receiving receptacle is placed. During this ejecting movement, plate 76 rides downwardly and strikes the caps to knock them downwardly onto chute 80, plate 78 at the same time riding upwardly on the horizontal flange of angle 51. The transverse ejecting movement is limited by the left hand end of core 63 striking a suitable abutment. Just before this occurs, the outer sloped portion of pin 90 strikes the upper end of latch 86, moving it again to the position of Figure 3, permitting spring 88 to swing lever 82 to its original position, thus opening switch 84, 85 and breaking the solenoid circuit. Springs 70 and 71 then return the ejecting means to the position of Figure 2.

Angles 49 and 51 are of a length which is a substantially even multiple of the cap diameter so that when they are filled with caps throughout their longitudinal extent, no cap will be partly between them and partly in chute 30 so as to be mutilated as a result of the ejecting action. As here shown, six caps are receivable between the angles, so that as a result of each ejecting action, exactly six caps have been ejected. By counting the ejecting actions and multiplying by six, the total count is arrived at. As particularly indicated in Figures 1 and 3, in the line of caps being pushed from the rear the individual caps are necessarily in mutual contact at least by the time the trigger switch arm 82 is actuated. Ordinarily, the caps are all fed open side up, but where they do not have extended end flanges, their position makes no difference and they may be either side up or intermixed. If desired, their movement onto the bar 40 may be restrained as by a spring finger 91 secured to and extending downwardly from the cross member 32. During ejection, however, one of the angles 49, 51 blocks the feed chute, to prevent movement of the caps onto bar 40. In Figure 5, for example, the angle 51 is shown in blocking position.

It will be understood that the invention is not restricted as to the number of articles ejected at each operation and this number may be from one up to as many as may be conveniently fed.

In the embodiment of the invention as illustrated, the total number of ejecting operations are adapted to be counted and the direction of ejection is adapted to be changed, that is, after a sufficient number of caps have been discharged into the receptacle below chute 80, the direction of ejection is automatically reversed to discharge over chute 81 to a receptacle therebelow. For these purposes, the following mechanism is provided.

A hollow block 92 mounted at its ends on plate 37 and a frame side member has upright end portions 93 and 94 providing bearings for the ends of a screw spindle 95. Adjacent bearing 93, the spindle has fixed thereon a ratchet wheel 96, a ratchet wheel 97 similar to the first but reversed as to driving direction, being fixed on the spindle in spaced relation to the first. Between the two ratchet wheels, a two-armed lever 98 is swingable on the spindle.

The lower arm of lever 98 carries a pin 99 engaged in slots in the upper bifurcated end of a two-arm lever 100, the latter being pivoted on a pin 101 supported between adjacent flanges of block 92 and extending below the latter. The supporting flanges and pin 101 extend downwardly through an opening in plate 37.

The upper arm of lever 98 carries oppositely directed pawls 102 and 103, for cooperation with ratchet wheels 96 and 97, respectively, the pawls being yieldingly held against the ratchet wheels by means of spring fingers secured to the top of lever 98 by a screw 98' which is passed through a cross portion connecting the fingers.

The action of pawl 103 is controlled by a vertical plate 104 secured to block 92 at the side of ratchet wheel 97. Referring to Figure 2, it will be seen that plate 104 has a top edge 105 which extends laterally beyond the periphery of ratchet wheel 97, the end of the pawl resting on this edge when lever 98 is in its normal vertical position as shown. If the lever is swung in a counter-clockwise direction, the pawl slides along edge 105 and is deflected out of cooperating relation with the teeth of ratchet wheel 97. However, if lever 98 is swung in a clockwise direction, the nose of the pawl is enabled to ride on the ratchet wheel and to come to operative engagement behind a tooth so that when the lever is returned to its vertical position, ratchet wheel 97 and spindle 95 will be turned. Pawl 102 has associated therewith a similar control plate 106, shown in Figure 3 and in dotted lines in Figure 2, it being understood that plate 106 has a reversed position as regards plate 104. Each operative movement of lever 98 is from the illustrated vertical position to one side or the other thereof and back again to vertical position.

Mounted on top of block 92 is an elongated substantially U-shaped slide 107, the slide being guided by a rib 108 and also by the stems of screws 109 and 110 threaded therein and projecting downwardly through longitudinally extending slots in the top of block 92. Compression springs interposed between the heads of the screws and washers bearing against the bottom of the block wall frictionally hold slide 107 against the top of the block. Movement of the slide is limited by the extent of the guide slots and also by an abutment screw 111 threaded into the end wall of block 92. The right hand leg 112 of the slide has threaded therein from its inner side an abutment screw 113, the outer end of the screw being engaged in a threaded socket of a pin 114 which projects a substantial distance beyond the end flange of block 92 through an opening provided therein. Spindle 95 has a similar extension beyond the bearing 94 and is provided at its extremity with a knob 115.

Threaded on spindle 95 is a block 116 having a downwardly extending finger 117 whose lower rectilinear end closely overlies the top surface of slide 107 to be prevented thereby from turning with the spindle. Upon rotation of the spindle, block 116 may be traversed therealong. Rotation of the spindle in one direction will carry the block to the right into engagement with abutment screw 113, whereupon slide 107 will be moved with the finger. Upon reversal of rotation of spindle 95, the block will be moved to the left to bring finger 117 into engagement with leg 118, whereupon the slide will be carried to the left. The direction of rotation of spindle 95 depends, of course, upon which of the two sets of pawls and ratchets is active. With the pawls in neutral position, block 116 may be traversed by turning knob 115 and slide 107 may be moved in one direction or the other by manipulation of pin 114. If desired, finger 117 may be provided with a pointer 119 for cooperation with an index on slide 107, each interval of the index indicating a step of the ratchets.

On its inner side, slide 107 has secured an insulating block 120 to which is secured, by means of a threaded stud, an elongated contact member 121, the stud being part of a terminal 122. Fixed on the top of block 92 at the ends of contact 121 are the insulated contacts 123 and 124. At the limits of the slide movements, above described, contact 121 will operatively engage either contact 123 or 124 for the purpose of changing the control circuit from one of solenoids 65 or 66 to the other.

Referring to Figure 2, a link comprising sections 125 and 126 connects the lower portion of lever 59 and the lower arm of lever 100. Section 126 has at one end a longitudinal bore into which the adjacent end of section 125 is threaded. Section 126 has an elongated transverse slot which receives a pin 127 carried by the lower bifurcated arm of lever 100. Plungers 128 and 129 in the bore of section 126 are pressed against pin 127 by springs 130 and 131.

Adjacent the outer end of section 126, a bracket 132 fixed to the frame carries a total counter 133. The counter has an operating shaft to whose end adjacent section 126 is fixed a disc 134 carrying diametrically opposite pins 135 and 136, the shaft and disc being spring biased in a clockwise direction to the limit position shown in Figure 2. In this position, pins 135 and 136 lie respectively adjacent fingers 137 and 138 projecting from link section 126. It will be evident that whether link 125, 126 is moved to the left or to the right from the normal position shown, an operative turn in counterclockwise direction will be transmitted to the counter through one of the sets of pins and fingers. At the same time, lever 100 will be swung in one direction or the other through the yielding connection provided by pin 127 and the plungers and springs. The length of the link is preferably somewhat adjustable as provided, for example, by a threaded connection of section 125 with a clevis through which it is connected to lever 59, as shown.

In Figure 7 I have shown an electrical circuit including the solenoids 65 and 66, contacts 84 and 85 and contacts 121, 123 and 124, a relay 139 also being provided for establishing the circuit to the selected solenoid as determined by the engagement of contact 121 with contacts 123 or 124. In the absence of the relay, contact 121 would necessarily be always in engagement with either contact 123 or 124. Since the machine is subjected to considerable vibration, accidental displacement of contact 121 is possible so that the holding relay is preferably provided as a matter of precaution.

With contact 121 engaged with contact 124, a circuit including switch 84, 85 and solenoid 65 will exist. This means that each time switch 84, 85 is closed, solenoid 65 will be energized and lever 59 will be rocked in a counter-clockwise direction with the ejection effect already discussed. Upon each movement of lever 59, link 125, 126 will be moved to the right, Figure 2, and finger 138 will engage pin 136 to advance the total counter by a unit. At the same time, lever 100 will be swung in a counter-clockwise direction and lever 98 in a clockwise direction. Upon return of lever 59 to its vertical position, lever 98 will resume its vertical position and pawl 103 will drive its associated ratchet to turn the spindle and carry finger 117, Figure 3, one step to the left.

This action will continue until finger 117 abuts leg 118 and moves slide 107 to the left. Hereupon, contact 121 is engaged with contact 123 and the circuit now includes solenoid 66 instead of solenoid 65. When next switch 84, 85 is closed lever 59 will be swung in a clockwise direction and link 125, 126 moved to the left. Finger 137 through pin 135 operates the total counter. Lever 100 is swung in a clockwise direction and lever 98 in a counter-clockwise direction. Upon return, pawl 102, through its associated ratchet turns spindle 95 by a step so that finger 117 moves to the right, Figure 3. This continues until contact 121 is again moved into engagement with contact 124, whereupon the sequence is repeated. It will be noted that spindle 95 is turned only upon return movement of lever 98, since otherwise switching from one solenoid to the other would occur prematurely. In order to prevent overthrow of the ratchets, I may provide friction control means such as the spring pressed plunger 140, Figure 3, bearing against the outer face of ratchet 96.

If desired, several counting chutes may be utilized together for actuation by the same pair of solenoids and equipped with a common counter and solenoid selecting means. In this case, the trigger switches of all the counting chutes will be connected in series and in Figure 7a it is assumed that two additional counting chutes are provided and equipped with trigger switches 84a, 85a and 84b, 85b. With the several trigger switches in series, it is assured that none will act until all the counting chutes are full, since, until then, no circuit can be completed to the actuating solenoid.

The embodiment shown in Figures 8 to 14 is basically the same as that just described. In this second embodiment, however, it is assumed that crown caps instead of the relatively large screw caps shown in connection with the first embodiment are to be counted. Reference numeral 150 designates generally the centrifugal feeding device and 151 the feed chute in advance of a bar 40'. The feed chute has a top cover provided with a slot through which extends a wheel 152 having a soft rubber rim 153. The wheel 152 is freely supported by a link 154 and rests on top of the feed caps, serving to hold the latter down and also, due to its momentum, to assist in the feed.

A cross plate 37' supports bearings 155 and 156 for one end of a shaft 157 whose opposite end is supported in a bearing 158. Shaft 157 lies directly above bar 40' and carries three discs 159, 160 and 161 fixed thereon.

The discs 159, 160 and 161 are each provided with twelve recesses spaced about the periphery, the recesses of the several discs being in register and having secured therein channel strips 162, the essential features of these strips being their side walls 163 and 164, these side walls in the position of parts shown in Figure 9 constituting a chute in conjunction with bar 40'. The drum constituted by the channel strips and discs has a maximum radius somewhat less than the distance between the axis of shaft 157 and the top of bar 40' so that it may rotate without interfering with the latter and so that the distance between the top of bar 40' and the bottoms of the channels is somewhat greater than the depth of the caps, these latter being indicated at 165.

Pivoted in a slot in bar 40' at the outer end of the drum is a two-arm lever 166 whose lower end carries a contact 167 for cooperation with a fixed contact 168. The upper arm of the lever has a nose 169 extending toward disc 161. Fixed on the outer face of disc 161 concentrically therewith and directly in front of nose 169 is a ring 170 which is provided with radial grooves 171 in the central longitudinal planes of the channel strips 162. When nose 169 is in one of these grooves, contact 167 is spaced from contact 168. Upon rotation of the drum, however, nose 169 is cammed out of the groove onto a land of ring 170 and is thus swung in a clockwise direction to engage contact 167 with contact 168, the contacts remaining engaged until nose 169 is forced into the succeeding groove as by a compression spring 172.

A bell crank lever 173 pivotally supported on the top of bearing 158 has a tail portion engaged by a compression spring 174 to urge the upper portion of the lever against ring 170, the upper portion having a nose adapted to engage a groove 171 for the purpose of holding the same against accidental rotation. Nose 169, the nose of lever 173, and grooves 171, are all preferably V-shaped in cross section so that no positive lock of the drum can be effected. Spring 172 is necessarily rather weak since it must be overcome by the force of the caps impinging upon lever 166. Spring 174, however, may be as powerful as necessary. Whenever notches 171 are engaged by the noses of levers 166 and 173, a channel 162 is directly above bar 40' as shown in Figure 9.

Fixed in spaced relation on shaft 157 between bearings 155 and 156 are a pair of ratchet wheels 175 and 176, these being of the same size but with oppositely faced teeth for drive in opposite directions. Free on shaft 157 between the ratchet wheels is the hub 177 of a two-arm lever 178, 179, arm 179, together with the lower portions of the ratchet wheels, projecting downwardly through an opening provided in plate 37'. At its upper end, lever 178 carries a pin 180 on the ends of which are mounted pawls 181 and 182, the former for cooperation with ratchet 175 and the latter for cooperation with ratchet 176, a suitable holddown spring 183 for the pawls being secured to the top of arm 178.

Secured to upward extensions of bearings 155 and 156 are a pair of pawl control plates 184, 185, these being shown in outline in Figure 13, plate 184 also appearing, partly in dotted lines, in Figure 10. The width of the pawls is such that they overlie both their associated ratchets and plates.

Referring particularly to Figures 10 and 13, the lever 178, 179 is shown in its normal vertical position. If the lever is swung in a counter-clockwise direction, pawl 182, which is shown as engaged behind the tooth of its ratchet 176, will similarly drive the latter. During this movement, pawl 181 rides up on the substantially rectilinear edge 184a of its plate 184 onto the arcuate edge 184b, this edge being slightly beyond the maximum circle of ratchet 175 associated with pawl 181, so that the nose of the pawl is prevented from dropping behind a tooth of its ratchet. Upon return of the lever to its upright position, pawl 182 rides up and behind the next tooth of its ratchet, the nose of pawl 181 returning into substantial abutment with a tooth of its ratchet but without effecting any movement of the latter. Similarly, if lever 178 is swung in a clockwise direction, pawl 181 will drive its ratchet the space of one tooth, while pawl 182 will be rendered inoperative by its control plate 185.

A pair of solenoids 65' and 66' mounted on bases 186 and 187 on top of plate 37' have associated therewith a core 63'. The core 63' has centrally a vertical slot through which lever arm 178 extends, the core being made up of spliced sections for the purpose of assembly with the lever arm. The core carries a pin 187 extending across the slot and engaged in a longitudinally elongated slot 188 of lever arm 178. Upon energization of solenoid 65', the core 63' will be drawn to the left so that lever arm 178 is swung in a counter-clockwise direction from its normal vertical position, the opposite occurring when solenoid 66' is energized. Lever arm 179 carries intermediate its ends a pin 189 which is engaged in longitudinally extending slots in the ends of links 190 and 191, the other ends of these links being pivoted to pawls 192 and 193 pivotally mounted on lugs projecting below plate 37'. Pawl 192 is in the plane of ratchet 175 and pawl 193 is in the plane of ratchet 176 as clearly shown in Figure 12. A tension spring 194 connecting links 190 and 191 pulls the two toward each other and normally holds the inner end walls of their slots against pin 189.

A spring pressed plunger 195 slidable in an enlargement on the top of plate 37' carries at its end a roller 196 which bears against the upper end of pawl 193, the spring tension being adjustable by means of a threaded spring abutment block 197. A tension spring 198, anchored at one end to the lower extremity of lever arm 179 and at the other end to the frame, tends to pull lever arm 179 to the left. The two springs substantially balance each other so that the lever 178 and 179 is normally yieldingly held in the vertical position shown and pawls 192 and 193 are out of the paths of the teeth of their associated ratchets.

Upon energization of solenoid 65', for example, and consequent swinging of lever 178, 179 in a counter-clockwise direction, pin 189 will push link 191 to the right, Figures 10 and 12. Through spring 194, link 191 will draw link 190 also to the right, thus swinging pawl 192 toward ratchet 175. This movement is sufficiently retarded so that the pawl will not come in front of the directly adjacent tooth 175a of the ratchet but will come against the top thereof and will be in position to engage the next tooth 175b so as to prevent overthrow. Due to the provision of spring 194, pawl 192 is pulled yieldingly against the top of tooth 175a so as to be able to ride thereon without binding.

The lower extremity of lever arm 179 is pivoted to a link 125', 126' exactly the same as the link 125, 126 described with reference to the first embodiment, this link actuating the same counting and solenoid selecting mechanism as heretofore described and as shown in Figures 8, 9 and 10.

Immediately in advance of the ejecting drum, I may provide holding means for the line of caps in the feed chute. Such means may be in the form of a pivoted flap 199, Figures 10 and 11, set in the top surface of bar 40' just in advance of the drum and with its free end extending toward the drum. Under the free end of the flap is provided a bore in which a plunger 200 is upwardly projectable by means of a solenoid 201.

A simple operating circuit is shown in Figure 14, the same contacts 121, 123 and 124 being shown as in the diagram of Figure 7, but the relay circuit being omitted. Depending upon which of contacts 123 and 124 contact 121 engages, a circuit will be completed to one or the other of solenoids 65' and 66' for drive of the ejecting drum when contact 167 is moved against contact 168. Simultaneously with the energization of the selected solenoid 65' or 66', solenoid 201 will be energized and will force plunger 200 against flap 199, lifting the latter and forcing the cap thereabove against the top wall of the feed slide to hold it against movement. This latter provision may of course be omitted since when the drum is turning the projecting portions of disc 159 between the channels blocks the feed.

As here shown, each channel 162 is of sufficient length to receive a dozen caps so that the latter are counted in even dozens. It is of course immaterial to the invention what the length of these channels is and the channels may obviously be designed for the reception of any type of closure or other adapted article. It will be understood that the drum is intermittently operated in the same direction until the required number has been counted, whereupon it is automatically reversed. Since, according to the second embodiment, twice as many caps are counted in each ejecting operation as in the first embodiment, finger 117 of the switching device, Figure 3, should only move half as far along spindle 95 before effecting reversal if the same number of caps is to be counted as in the first embodiment. To take care of this, interchangeable abutment screws 113 may be provided and are provided at all events in both embodiments in order that reversal may be effected at varied intervals to effect different counts. Depending upon the direction of drum rotation, the ejected caps pass either to chute 203 or chute 204, Figures 8 and 9.

It will be understood that the illustrated electrical systems may be applied interchangeably in the two embodiments shown.

It will be understood that the invention is susceptible of varied embodiments and that, accordingly, I do not limit myself except as in the following claims.

I claim:—

1. Apparatus of the class described comprising means for feeding a line of articles, a movable abutment in the path of feed, means operated upon each movement of the abutment under impact of the leading article thereon to eject the same transversely of the line in either direction, counting mechanism actuated as a result of each operation of said last named means, and means controlled by the counting mechanism for automatically reversing the direction of ejection each time a certain number of the articles have been counted on ejection in one direction.

2. Apparatus of the class described comprising means for feeding a line of articles, a movable abutment in the path of feed, means operated upon each movement of the abutment under impact of the leading article thereon to eject the same transversely of the line in either direction, counting mechanism actuated as a result of each operation of said last named means, means controlled by the counting mechanism for automatically reversing the direction of ejection each time a certain number of the articles have been counted on ejection in one direction, a total counter, and means for advancing said counter as a result of each ejecting operation regardless of the direction thereof.

3. Apparatus of the class described comprising means for feeding a line of articles, a movable abutment in the path of feed, means operated upon each movement of the abutment under impact of the leading article thereon to simultaneously eject a certain number of the articles transversely of the line in either direction, counting means actuated as a result of each operation of said last named means, and means controlled by the counting means for automatically reversing the direction of ejection each time a certain number of ejecting operations have occurred in one direction.

4. In apparatus of the class described, a chute having a bottom wall and transversely movable side walls, means for simultaneously moving said side walls in the same direction relative to the bottom wall whereby the trailing side wall acts to eject transversely of the bottom wall an article on the latter, and means effective to tilt the article during the ejecting operation to facilitate its ejection.

5. In apparatus of the class described, an elongated support, means providing parallel walls extending lengthwise of said support adjacent the edges of the latter and defining a chute in conjunction with said support, and means for moving said walls transversely in either direction relative to the support to eject transversely of the support an article on the latter.

6. In apparatus of the class described, an elongated support, means providing parallel walls extending lengthwise of said support adjacent the edges of the latter and defining a chute in conjunction with said support, and means for moving said walls transversely in either direction relative to the support to eject transversely of the support an article on the latter, and means rendered operative upon a certain number of successive movements of said side walls in one direction to reverse the direction of movement of said side walls.

7. In apparatus of the class described, a chute comprising a bottom wall and side walls movable in unison transversely of said bottom wall relative thereto, electrically operated means for moving said side walls in either direction to eject an article from said bottom wall, and means rendered operative upon a certain number of successive movements of said side walls in one direction to reverse the direction of movement of said side walls.

8. Apparatus according to claim 7 wherein a rotatable drum is provided and carries a number of sets of said side walls equally spaced about its periphery.

9. In apparatus of the class described, a chute comprising a bottom wall and side walls movable in unison transversely of said bottom wall relative thereto, a pair of solenoids having a common core piece reciprocable as a result of alternate energization of said solenoids, and connections between said core piece and said side walls whereby the latter are movable in either direction to eject an article in either direction from said bottom wall.

10. Apparatus of the class described comprising a chute having a bottom wall and side walls movable in unison transversely of said bottom wall relative thereto, counting mechanism, a pair of solenoids having a common core piece reciprocable as a result of alternate energization of said solenoids, connections between said core piece and said side walls whereby the latter are movable in either direction to eject an article in either direction from said bottom wall, and a selecting circuit for said solenoids controlled by said counting mechanism.

11. Apparatus of the class described comprising a chute having a bottom wall and side walls movable in unison transversely of said bottom wall relative thereto, a pair of solenoids having a common core piece reciprocable as a result of alternate energization of said solenoids, connections between said core piece and said side walls whereby the latter are movable in either direction to eject an article in either direction from said bottom wall, counting mechanism stepped as a result of each ejecting action, and a selecting circuit for said solenoids controlled by said counting mechanism.

12. In apparatus of the class described, means for feeding a line of articles, a normally open switch, a movable switch arm in the path of feed and moved to close the switch upon abutment thereagainst of the leading article, rotary means for ejecting an article transversely of the line, electrically operated means for driving said ejecting means, and a cam ring rotatable with said ejecting means and having lands operative to engage said switch arm during the ejecting operation to hold the switch closed.

13. In apparatus of the class described comprising electrically intermittently operated article ejecting means, said means having a reversible action whereby to eject articles in different directions, the combination of a rotatable screw spindle having a follower thereon movable between limit positions, means for turning the screw as a result of each ejecting operation to traverse said follower, the direction of rotation of said screw spindle being dependent upon the direction of ejection of said ejecting means, and a circuit controlled by said follower at its limit positions to reverse the action of said ejecting means and thereby the direction of rotation of said screw.

14. In apparatus of the class described comprising electrically intermittently operated article ejecting means, said means having a reversible action whereby to eject articles in different directions, the combination of a rotatable screw spindle having a follower thereon movable between limit positions, means for turning the screw as a result of each ejecting operation to traverse said follower, the direction of rotation of said screw spindle being dependent upon the direction of ejection of said ejecting means, a slide having abutments engageable by said follower at its limit positions, a contact carried by said slide, spaced fixed contacts alternately engageable by the slide contact in its limit positions, and a circuit controlled by said contacts to reverse the action of said ejecting means and thereby the direction of rotation of said screw.

15. In apparatus of the class described, a chute having a bottom wall and side walls movable in unison transversely of the bottom wall in either direction relative thereto, an abutment at one end of said chute movable to a limited extent as the result of impact thereupon of the leading one of a line of articles fed along said chute, said abutment being then effective to arrest movement of the articles in the chute, a switch closed as a result of such movement of said abutment, electrically operated means rendered operative as the result of the closing of said switch to move said side walls and thereby eject transversely of said bottom wall the articles resting on the latter, means operative to return the abutment, switch and side walls after such ejecting action, and means operative after a certain number of ejections in one direction to automatically reverse the ejecting direction.

16. In apparatus of the class described, a chute having a bottom wall and side walls movable in unison transversely of the bottom wall in either direction relative thereto, an abutment at one end of said chute movable to a limited extent as the result of impact thereupon of the leading one of a line of articles fed along said chute, said abutment being then effective to arrest movement of the articles in the chute, a switch closed as a result of such movement of said abutment, electrically operated means rendered operative as the result of the closing of said switch to move said side walls and thereby eject transversely of said bottom wall the articles resting on the latter, means operative to return the abutment, switch and side walls after such ejecting action, and means operative after a certain number of ejections in one direction to automatically reverse the ejecting direction, said last named means comprising counting mechanism stepped upon each ejection and a circuit controlled by said counting mechanism.

17. In apparatus of the class described, a chute comprising a horizontal bottom wall and side walls movable in unison transversely of the bottom wall relative thereto, said side walls normally occupying positions spaced from the lateral edges of said bottom wall, an abutment at one end of said chute movable to a limited extent as the result of impact thereupon of the leading one of a line of articles fed along said chute, said abutment being then effective to arrest movement of the articles in the chute; means rendered operative as the result of such movement of said abutment to move said side walls relative to said bottom wall, the distance of the side walls apart being slightly greater than the width of the articles and such movement of the side walls displacing the articles on the bottom wall sufficiently transversely of the latter to enable the said articles to fall therefrom, and return means for the abutment and side walls.

18. In apparatus of the class described, a chute comprising a horizontal bottom wall and side walls movable in unison transversely of the bottom wall relative thereto, said side walls normally occupying positions spaced from the lateral edges of said bottom wall, an abutment at one end of said chute movable to a limited extent as the result of impact thereupon of the leading one of a line of articles fed along said chute, said abutment being then effective to arrest movement of the articles in the chute; means rendered operative as the result of such movement of said abutment to move said side walls relative to said bottom wall, the distance of the side walls apart being slightly greater than the width of the articles and such movement of the side walls displacing the articles on the bottom wall sufficiently transversely of the latter to enable the said articles to fall therefrom, an externally pivoted striker resting on that side wall which moves away from the bottom wall, said striker dropping as the side walls move and striking the portions of the articles which overhang the bottom wall to assist in their ejection, and return means for the abutment and side walls.

19. In apparatus of the class described, a chute having a bottom wall and side walls movable in unison transversely of the bottom wall relative thereto, an abutment at one end of said chute movable to a limited extent as the result of impact thereupon of the leading one of a line of articles fed along said chute, said abutment being then effective to arrest movement of the articles in the chute, a switch closed as a result of such movement of said abutment, electrically operated means rendered operative as the result of the closing of said switch to move said side walls and thereby eject transversely of said bottom wall the articles resting on the latter, means for holding said switch closed during the ejecting operation, and means operative to return the abutment, switch and side walls after such ejecting action.

20. Apparatus of the class described comprising means for feeding a line of articles, an abutment in the path of feed having limited movement under impact of the leading article, means movable transversely of the line of feed and operated upon each movement of the abutment under impact to strike and eject an article transversely of the line in either direction, counting mechanism stepped upon each ejecting action, and means controlled by the counting mechanism for automatically reversing the ejecting direction of said movable means each time a certain number of the articles have been counted on ejection in one direction.

21. Apparatus of the class described comprising means for feeding a line of articles, an elongated narrow support along which the articles are fed, spaced walls in fixed relation to each other extending along said support and forming a chute therewith, an abutment at the tail end of said chute movable slightly under the impact of the leading article thereupon, the support being of a length to accommodate a certain number of said articles and said walls being of similar length, means operative to move said walls in unison in a direction transverse to said support upon each movement of said abutment under impact whereby one of said walls acts to eject said certain number of articles from the support in advance of the abutment, and counting means stepped upon each ejecting action.

22. Apparatus of the class described comprising means for applying continuous yielding feeding pressure to a line of articles, an elongated narrow support along which the articles are fed, spaced walls in fixed relation to each other extending along said support and forming a chute therewith, an abutment at the tail end of said chute movable slightly under the impact of the leading article thereupon, the support being of a length to accommodate a certain number of said articles and said walls being of similar length, means operative to move said walls in unison in a direction transverse to said support upon each movement of said abutment under impact whereby one of said walls acts to eject said certain number of articles from the support in advance of the abutment, said one of said walls serving to block articles fed during such ejecting movement, and counting means stepped upon each ejecting action.

23. Apparatus of the class described comprising means for feeding a line of articles, an elongated narrow support along which the articles are fed, spaced walls extending along said support and forming a chute therewith, an abutment at the tail end of said chute movable slightly under the impact of the leading article thereupon, the support being of a length to accommodate a certain number of said articles and said walls being of similar length, means operative to move said walls in unison in a direction transverse to said support upon each movement of said abutment under impact whereby one of said walls acts to eject said certain number of articles from the support in advance of the abutment, said walls being movable transversely to the support in either direction, counting means stepped upon each ejecting action, and means controlled by the counting means for reversing the direction of movement of said walls after a certain count of the articles has been made on ejection in one direction so that the other of said walls becomes effective to eject from said support in a direction opposite to the first direction of ejection.

HARRY A. RAU.